Patented Apr. 13, 1937

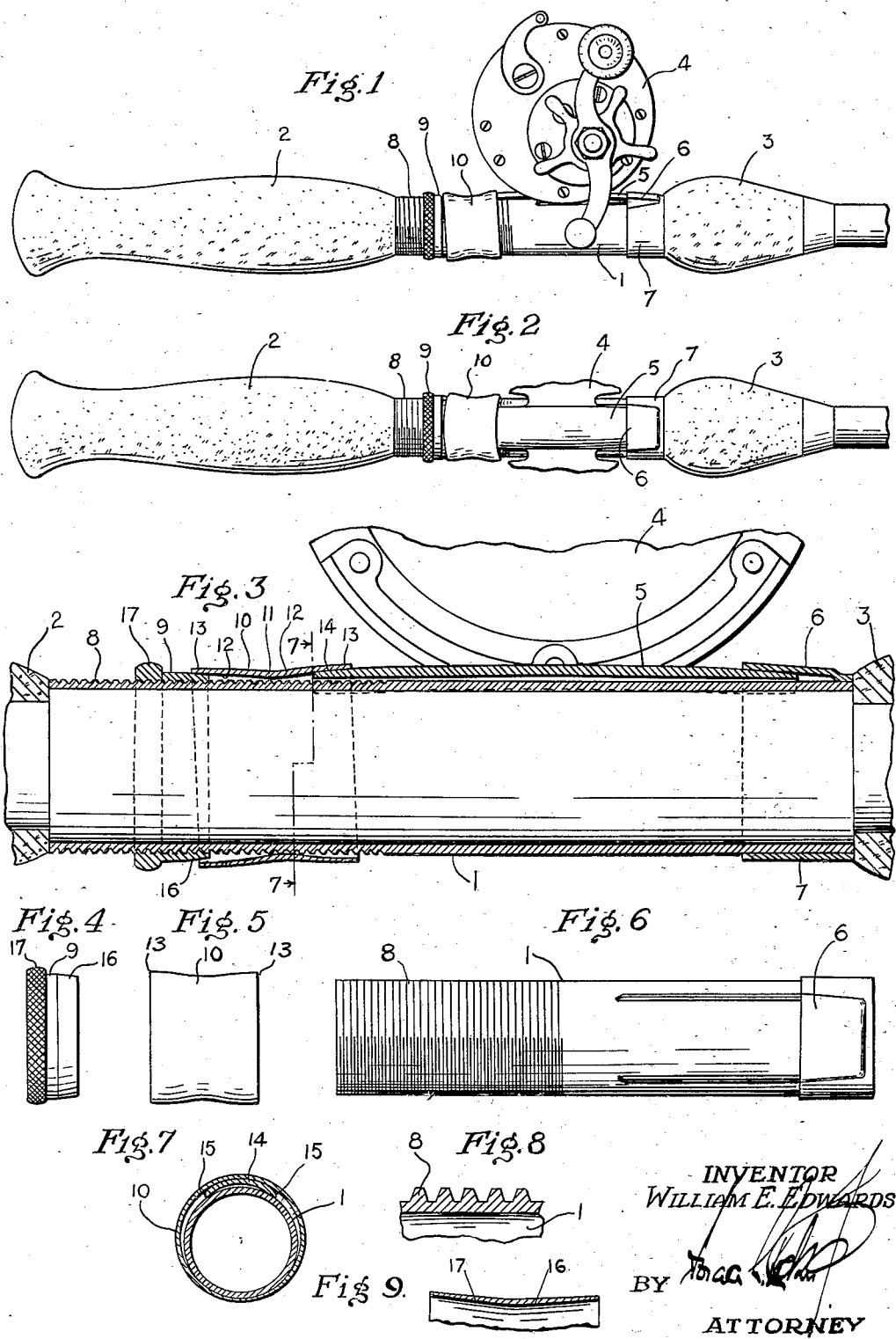

2,076,628

UNITED STATES PATENT OFFICE 2,076,628

REEL SEAT FOR FISHING RODS

William E. Edwards, Mount Carmel, Conn., assignor to The Horton Manufacturing Company, a corporation of Connecticut Application June 1, 1935, Serial No. 24,573

25 Claims. (Cl. 43—22)

My invention relates to reel seats for fishing rods.

It has among its objects to provide an improved reel seat which provides an exceedingly effective holding means adapted to hold securely even the heaviest reels used in salt water fishing. A further object of my invention is to provide such an improved reel seat including an improved rocking member adapted to cooperate with the reel base plate and to clamp the latter from the top in an improved manner when operated upon by an improved cooperating member. Further objects of my invention are to provide an extremely simple construction, and one capable of being economically manufactured, and which is not only adapted for use with reel bases of widely varying length and thickness, but, moreover, is very easy to tighten and loosen, despite its effectiveness as a holding means. These and other objects and advantages of my improved construction will, however, hereinafter more fully appear.

In the accompanying drawing, I have shown, for purposes of illustration, one embodiment which my invention may assume in practice.

In this drawing,—

Figure 1 is a side elevation of the handle portion of a rod equipped with my improvement;

Fig. 2 is a top plan view of the same, the reel frame being broken away to facilitate illustration;

Fig. 3 is an enlarged longitudinal section view of the reel seat structure and rod, the reel here also being broken away;

Fig. 4 is a detail side elevation of the tightening member;

Fig. 5 is a like view of the rocking sleeve;

Fig. 6 is a like view of the reel seat or barrel;

Fig. 7 is an enlarged sectional view on line 7—7 of Fig. 3;

Fig. 8 is an enlarged detail showing a section of the thread on the barrel, and

Fig. 9 is a detail sectional view of a modified form of rocking sleeve.

In this illustrative construction, I have shown the invention applied to a rod having a usual reel seat or barrel 1 provided with usual rear and front grips 2 and 3, respectively, and carrying a usual reel 4; improved means being provided for attaching the reel to the seat 1 as hereinafter described.

Referring more particularly to my improved construction, it will be noted that herein the reel base plate 5 is received at its front end in a suitable socket forming means 6 on a front band 7 attached as usual to the seat or barrel 1, while my improved attaching means is at the rear end of the latter and cooperates with the rear end of the reel base plate 5. Attention is further directed to the fact that the member 1 is threaded, as at 8, over a substantial portion of its rear end; the threading herein extending from the extremity of the member 1 beyond the adjacent extremity of the reel base plate 5 and being of the flat topped thread type, with the tops of the threads preferably substantially flush with the unthreaded outer surface of the member 1. Moreover, it will be noted that a threaded member 9 is provided movable on this threaded portion and of an improved construction and cooperating in an improved manner with an improved rocking member or sleeve 10 which engages the rear end of the reel base plate 5.

Referring more particularly to the improved member 10, it will be noted that the same is in the form of a sleeve of thin metal externally and internally tapered from each end toward a region of minimum diameter 11 midway between its ends. Further, it will be observed that the sleeve is of identic construction in each half, and accordingly equally useful irrespective of how the same is assembled on the member 1. Moreover, it will be noted that the inside surface 12 of each end slopes from the region 11 substantially to the outer extremity thereof, but at such extremity is provided with a portion 13 which is relatively cylindrical. As shown, the member 10 is also of such internal diameter at each opposite end that it will readily receive the end of the reel base plate 5 within the same. Also, in a preferred construction, the end of this plate is also tapered and rounded on its top, as shown at 14, and herein also has its extremity in engagement with the threaded surface 8 at transversely spaced points 15, as shown in Figure 7; all so that the end of the reel base plate 5 is adapted to cooperate with the adjacent inner surfaces 13 and 12 on the sleeve 10, and securely positioned, when the sleeve 10 is moved longitudinally into engagement with the top portion 14. It will moreover be noted that the member 9 is provided with a tapered end 16 similarly adapted to be received in the end portion 13 of the member 10 opposite from that engaging the portion 14 of the reel base plate 5, while this member 9 is also preferably provided with a knurled portion 17 of any suitable character, adapted to facilitate rotation thereof and consequent longitudinal movement of the member 9 into and out of operative relation with the rocking sleeve 10.

In the assembly of a reel upon my improved reel seat, it will be evident that when one end of the reel base plate 5 is projected into the socket 6, it is only necessary for the sleeve 10 to be brought into overlying relation to the opposite end of the plate and then to rotate the member 9, in order to fasten the reel 4 securely in position. More particularly, due to the construction of the member 10, the latter is rocked by the member 9 in such manner that the portions 12 and 13 of the member 10 press very tightly against the top of the portion 14 on the plate 5, while the disposition of the portion 16 of the member 9 is such that the member 10 is held very securely in this clamping position. In the operation of clamping the reel, the constricted part of the sleeve at one side thereof engages the barrel and thus provides a fulcrum for the sleeve. Thus, the sleeve is adapted to tilt or pivot about an axis disposed transversely to the barrel, and by camming a portion of the sleeve in a direction away from the barrel axis by means of member 9, a portion of the sleeve at the opposite end thereof is forced down on top of the reel base plate in the direction of the barrel axis. When the member 10 is in tilted, reel clamping position, as shown in Fig. 7, the member 10 and the barrel 1 form a socket for the reel base end having opposed surfaces eccentric to one another and of decreasing depth from the middle of the socket toward the respective sides thereof and also of decreasing depth longitudinally of the socket. In practice, it is found that this clamping action is so effective that even the heaviest reels, such as those used in salt water fishing, are securely fixed in position and retained therein under even the most trying service conditions. Further, it is possible so to secure the reel by an easy manual rotation of member 9 and to release the parts by a similar reverse rotation of this member, whereupon it will be evident that it is possible for the member 10 to be withdrawn and the plate 5 to be released to permit removal of the reel 4 as desired.

While the rocking sleeve above described is of identic construction at each end and provided with equal inside tapers at each end, it will be evident that, if desired, the end tapers may be different. Thus, for example, as shown in Figure 9, which is a detail of a modified sleeve sufficient to show these tapered portions, it will be noted that one tapered portion 16 is of less taper than the other tapered portion 17. With such a construction, the less tapered portion 16 is preferably disposed toward the reel base plate 5, but it will be evident that this also may be reversed to meet different conditions.

As a result of my improved construction, it is possible to eliminate the necessity for any such end abutment with the end of the reel base plate, as has heretofore been believed to be necessary to an effective holding action, and in lieu thereof, to obtain a new rocking action whereby a new and markedly more effective holding action is obtained than is possible with any end abutment structure of which I am advised. More particularly, it will be observed that in my improved construction, the member 10 does not abut the end of the portion 14 of the reel base plate 5, but instead, engages the top of the latter and presses down thereon increasingly harder and more effectively as the opposite end of the member 10 is raised by the member 9 when the latter moves longitudinally on the threads 8. As will be obvious, the loosely mounted clamping member is slidable along the barrel through a considerable range of movement and can be brought into fulcruming engagement with the barrel at any of a number of points in the length thereof. It will also be noted that the annularly constricted sleeve structure of the member 10 is very strong, and also especially adapted to cooperate with the member 9 to produce a rugged structure exerting a gripping action of great power. Attention is also directed to the facility with which the member 9 is adapted to be moved into or out of operative position, the relation of the parts being such that this member 9 is very readily moved with the fingers, all in such manner as to provide an unusually tight and effective clamp without requiring more than a relatively easy turning movement. Moreover, the member 9 is also readily moved in the reverse direction to release the parts. Here also is will be understood that, while in the illustrative construction I have shown the portion 14 of the reel base rounded and tapered and having portions 15 in engagement with the threaded portion 8, all in an improved manner most effective with my improved construction, the structure of the latter is such that it will very tightly hold the ends of reel base plates which are not thus especially shaped to cooperate therewith. In fact, one of the marked advantages of my improvement is that it is particularly adapted to use in connection with a wide range of varying lengths and thicknesses of the reel base members, which vary substantially with different reels. Attention is moreover directed to the complete absence of springs and to the minimum number of parts required. These and other advantages of my improved construction will, however, be clearly apparent to those skilled in the art.

While I have in this application specifically described two forms which my invention may assume in practice, it will be understood that these forms of the same are shown for purposes of illustration and that the invention may be modified and embodied in other forms without departing from its spirit or the scope of the appended claims.

What I claim as new and desire to secure by Letters Patent is:

1. In a reel seat, a barrel, a socket forming member thereon, a cooperating socket forming sleeve rockably mounted on the barrel, and means for rocking said sleeve into clamping position.

2. In a reel seat, a barrel, a socket forming member thereon, a rockable clamping sleeve thereon having oppositely extending socket forming portions, and means on said barrel and received in one of said portions for rocking the sleeve and thereby moving the other portion into clamping position.

3. In a reel seat, a barrel, a socket forming member thereon, a clamping sleeve thereon having oppositely tapered socket forming portions, and means on said barrel and received in one of said portions for rocking the other portion into clamping position.

4. In a reel seat, a barrel having a threaded portion, a sleeve rockably mounted on the barrel having a tapered portion adapted to receive one end of a reel base plate, and means threaded on said threaded portion for rocking said sleeve and thereby moving said tapered portion into engagement with the top of a base plate.

5. In a reel seat, a barrel having a threaded portion, a sleeve extending about the barrel having a tapered portion adapted to receive one end of a reel base plate, and means threaded on said threaded portion for rocking said tapered portion relatively to said barrel into engagement with the top of a base plate, said sleeve being of substantially greater minimum diameter than the external diameter of said barrel.

6. In a reel seat, a barrel having a threaded portion, a sleeve loosely embracing the barrel having a tapered portion adapted to receive one end of a reel base plate, and means threaded on said threaded portion for rocking said tapered portion relatively to said barrel into engagement with the top of a base plate, said sleeve having like internal tapered portions at each end thereof and being of minimum diameter intermediate the ends thereof.

7. In a reel seat, a barrel, a rocking sleeve thereon presenting socket means in its ends and having a portion of minimum internal diameter between its ends engageable with the barrel in effecting rocking of said sleeve relative to said barrel, and means on said barrel and engaging one end of said sleeve for rocking said sleeve and bringing the opposite end thereof into clamping position.

8. In a reel seat, a barrel, a rocking sleeve loosely mounted thereon presenting socket means in its ends and having a barrel engaging portion of minimum internal diameter between its ends acting as a fulcrum in the rocking of said sleeve relative to said barrel, and sleeve rocking means including a member threaded on said barrel and receivable in one end of said sleeve.

9. In combination with a barrel having socket means for one end of a reel base plate, said socket means having a rocking plate clamping portion movable toward and from the barrel, positively acting means for rocking said portion through variable distances toward said barrel as required for securing base plates of different dimensions.

10. In combination, a barrel, socket means for one end of a reel base plate carried by said barrel, and socket means for the opposite end of said plate including adjustable clamping means pressing down upon the top of said base plate in the direction of the barrel, said barrel having a threaded portion underlying said last mentioned plate end and engaged by the latter at spaced points.

11. In a fishing rod, a barrel presenting a reel seat, and a reel base clamping element comprising a tubular member loosely embracing said barrel and having a constricted intermediate portion acting as a fulcrum in clamping the reel base.

12. In combination, a barrel, socket means for one end of a reel base plate carried by said barrel, and socket means for the other end of said plate including a rocking sleeve on said barrel receiving that end of said plate in one end of said sleeve and means for rocking said sleeve on said barrel to clamp down upon the top of said plate end.

13. In combination, a barrel, socket means for one end of a reel base plate carried by said barrel, and socket means for the other end of said plate including a rocking sleeve on said barrel receiving that end of said plate in one end of said sleeve and movable about an axis transverse to the barrel and means for rocking said sleeve on said barrel to clamp down upon the top of said plate end, including an adjustable actuating member receivable in the opposite end of said sleeve.

14. In a fishing rod, a barrel member presenting a seating portion for a reel base, and a reel base clamping member loosely embracing said barrel member and having fulcrum means disposed transversely of said barrel member and engageable therewith in effecting clamping of the reel base, said clamping member having a reel base receiving socket portion which when in clamping position is disposed eccentrically to the barrel member.

15. In a reel seat assembly, a barrel member and clamping means including a clamping member presenting in conjunction with said barrel member an adjustable socket for receiving and clamping the end of a reel base, said socket in the clamping position thereof having curved relatively eccentric opposed surfaces and the socket progressively decreasing in cross section from the middle toward the respective sides thereof and extending laterally beyond the reel base so as to clear the same at the side edges thereof.

16. A reel base clamping member comprising a tubular member having an intermediate internal portion of minimum diameter and differently tapered internal portions leading therefrom toward opposite ends thereof.

17. A reel base clamping member comprising a tubular member having an intermediate internal portion of minimum diameter and tapered internal portions leading therefrom toward opposite ends thereof, said tapered portions each being provided with relatively straight end portions.

18. A reel fastener attachment receivable on a barrel and comprising an oppositely internally tapered sleeve and a cooperating actuating member therefor having an external surface engageble with one internal surface of said sleeve and also internally threaded for adjusting said member and sleeve relative to a barrel.

19. In a fishing rod, a member presenting a seating portion for a reel base, a member having fulcrum means intermediate of its ends and having one end portion adapted to clamp the reel base, and means for moving said second member about its fulcrum to clamp the reel base.

20. In a fishing rod, a member presenting a seating portion for a reel base, a member movable longitudinally with respect to the rod structure and mounted to tilt on an axis disposed transversely of the rod structure at any of a number of points in the length of the latter for clamping the reel base, and means for tilting said reel base clamping member.

21. In a reel seat assembly, a barrel, a reel base clamping member having means providing a fulcrum for said member intermediate of its ends, and camming means engageable with one end portion of said member for moving said member about its fulcrum and thereby clamping the other end portion thereof on a reel base positioned against said barrel.

22. In a reel seat assembly, a reel base clamping member having a fulcrumed mounting intermediate its ends, and rotatable camming means engaging said member at one end of the latter for moving the other end thereof into clamping position with respect to the reel base.

23. In a reel seat assembly, a tubular member mounted to tilt about an axis disposed transversely thereof for clamping a reel base, and means for tilting said member into clamping position.

24. In a reel seat assembly, a reel base supporting member, a movable member having a socket for one end of a reel base, said member being movable to bring said socket over the end of a reel base positioned on said supporting member and having means engageable with said supporting member to act as a pivot for said movable member, and means for moving said member pivotally to clamp the reel base.

25. In a reel seat assembly, a barrel, a movable member thereon having tapering socket means at one end engageable over the end of a reel base positioned against the barrel in order to clamp said base, said member having means engageable with said barrel as said socket means is brought into operative position to provide a pivot on which said member can move, and means for imparting pivotal movement to said member in a direction to increase the clamping pressure on the reel base.

WILLIAM E. EDWARDS.